United States Patent
Pleskot

(10) Patent No.: US 10,377,281 B2
(45) Date of Patent: Aug. 13, 2019

(54) SEAT TRANSFORMATION BRACKET

(71) Applicant: GM Global Technology Operations LLC, Detroit, MI (US)

(72) Inventor: Andrzej Pleskot, Rüsselheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 15/793,374

(22) Filed: Oct. 25, 2017

(65) Prior Publication Data
US 2019/0118685 A1    Apr. 25, 2019

(51) Int. Cl.
*B60N 2/68*    (2006.01)
*B60N 2/04*    (2006.01)
*B60N 2/16*    (2006.01)

(52) U.S. Cl.
CPC ............. *B60N 2/682* (2013.01); *B60N 2/045* (2013.01); *B60N 2/1615* (2013.01)

(58) Field of Classification Search
CPC ...... B60N 2/682; B60N 2/045; B60N 2/1615; B60N 2/02; B60N 2/04; B60N 2/16; B60N 2/1605; B60N 2/161; B60N 2/1625
USPC ............... 297/344.15, 344.14, 344.11, 344.1
See application file for complete search history.

(56) References Cited

U.S. PATENT DOCUMENTS

| | | | |
|---|---|---|---|
| 6,347,778 B1* | 2/2002 | Koga | B60N 2/1615 248/421 |
| 6,356,200 B1* | 3/2002 | Hamada | B60N 2/002 177/144 |
| 7,066,540 B2* | 6/2006 | Minai | B60N 2/1615 248/421 |
| 9,751,431 B2 | 9/2017 | Walter et al. | |
| 2010/0052390 A1* | 3/2010 | Dagcioglu | B60N 2/3011 297/324 |
| 2013/0161989 A1* | 6/2013 | Ito | B60N 2/1615 297/313 |
| 2017/0232871 A1* | 8/2017 | Asai | B60N 2/16 297/344.15 |

* cited by examiner

*Primary Examiner* — Mark R Wendell

(57) ABSTRACT

A seat assembly for a motor vehicle includes a side member, a front link, a rear link and a rail. The side member, the front link, the rear link and the rail form a four-bar linkage with four way movement. The seat assembly further includes a transformation bracket that is attached to the first side member and connected to the rear link to convert the seat assembly with four way movement to two way movement.

16 Claims, 3 Drawing Sheets

SEAT TRANSFORMATION BRACKET

INTRODUCTION

The present disclosure relates to a seat transformation bracket for motor vehicles. More specifically, the present disclosure relates to a seat transformation bracket that converts a seat assembly with four way movement to a seat assembly with two way movement.

Motor vehicles typically include seat assemblies that can be configured to support occupants within the vehicle. A seat assembly generally includes a seat bottom and a seat back, which can be supported on the seat bottom. In turn, the seat bottom may be secured to or otherwise supported on a pair of side members that translate forward and backward along respective rails secured to a floor located within a passenger compartment of the vehicle.

The seat assembly may also include a height adjuster assembly that raises and lowers the seat bottom and seat back. With such a configuration, the seat assembly has four way movement, specifically, backward and forward and up and down.

While current assemblies achieve their intended purpose, there is a need for a new and improved assembly that can be configured for either two way movement or four way movement without developing two separate types of assemblies.

SUMMARY

According to several aspects, a seat assembly for a motor vehicle includes a side member, a front link, a rear link and a rail. The side member, the front link, the rear link and the rail form a four-bar linkage with four way movement. The seat assembly further includes a transformation bracket that is attached to the first side member and connected to the rear link to convert the seat assembly with four way movement to two way movement.

In an additional aspect of the present disclosure, the seat assembly includes a second side member spaced apart and substantially parallel to the side member.

In another aspect of the present disclosure, the seat assembly includes a front tube and a rear tube spaced apart from the front tube, the side member and the second side member being connect by the front tube and the rear tube.

In another aspect of the present disclosure, the seat assembly includes a second transformation bracket that is attached to the second side member and connected to a second rear link to convert the seat assembly with four way movement to two way movement.

In another aspect of the present disclosure, the transformation bracket is attached to the side member with a plurality of bolts.

In another aspect of the present disclosure, the plurality of bolts is three bolts.

In another aspect of the present disclosure, the transformation bracket is connected to the rear link with a bolt.

In another aspect of the present disclosure, the transformation bracket has at least one raised portion that engages with an opening in the side member to prevent relative motion between the rear link and the side member.

In another aspect of the present disclosure, the transformation bracket has two raised portions that engage with the opening in the side member to prevent relative motion between the rear link and the side member.

In another aspect of the present disclosure, two of the four way movement are vertical movements with respect to the rail and the other two movements are translational movements along the rail.

In another aspect of the present disclosure, the two way movement are translational movements along the rail.

According to several aspects, a transformation bracket that converts a seat assembly with four way movement to two way movement includes a main body portion attached to a side member of the seat assembly, and a raised portion that engages with an opening of a side member of the seat assembly, the main body portion being connected to a rear link of the seat assembly to prevent relative motion between the rear link and the side member.

In an additional aspect of the present disclosure, the transformation bracket is attached to the side member with a plurality of bolts.

In another aspect of the present disclosure, the plurality of bolts is three bolts.

In another aspect of the present disclosure, the transformation bracket is connected to the rear link with a bolt.

In another aspect of the present disclosure, the transformation bracket has two raised portions that engage with the opening in the side member to prevent relative motion between the rear link and the side member.

In another aspect of the present disclosure, two of the four way movement are vertical movements with respect to the rail and the other two movements are translational movements along the rail.

In another aspect of the present disclosure, the two way movement are translational movements along the rail.

According to several aspects, a seat assembly for a motor vehicle includes a first side member and a second side member spaced apart from and substantially parallel to the first side member, a first front link and a second front link, a first rear link and a second rear link, and a first rail and a second rail spaced apart from and substantially parallel to the first rail. The first rail together with the first side member, the first front link and the first rear link and the second rail together with the second side member, the second front link and the second rear link forming a four-bar linkage with four way movement. The seat assembly also includes a first transformation bracket that is attached to the first side member and connected to the first rear link and a second transformation bracket that is attached to the second side member and connected to the second rear link. The first and second transformation brackets prevent relative movement between the side members and the respective rear links to convert the seat assembly with four way movement to two way movement.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
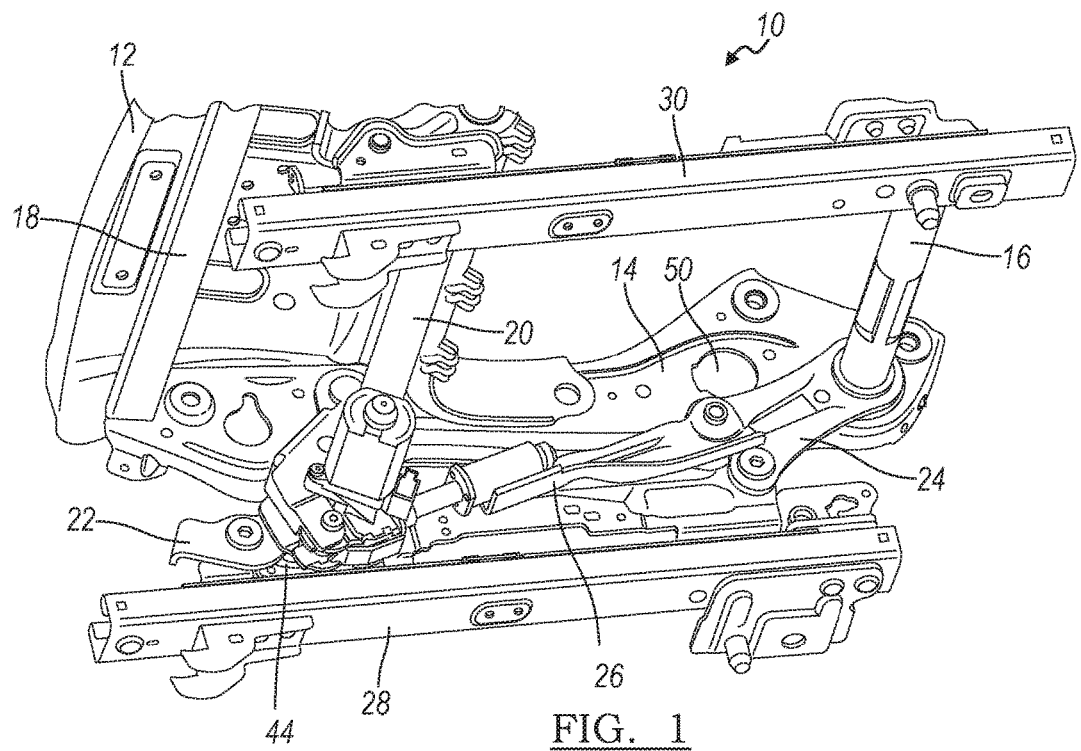
FIG. 1 is a perspective view of a seat assembly.

Referring to FIG. 1, there is shown a seat assembly 10. The seat assembly 10 includes a seat 12 attached to a pair of side members 14 spaced apart and positioned on either side of the seat 12. A fixed tube 18 is attached to and extends between the side members 14 to provide structural rigidity to the seat assembly 10.

Figure 3:
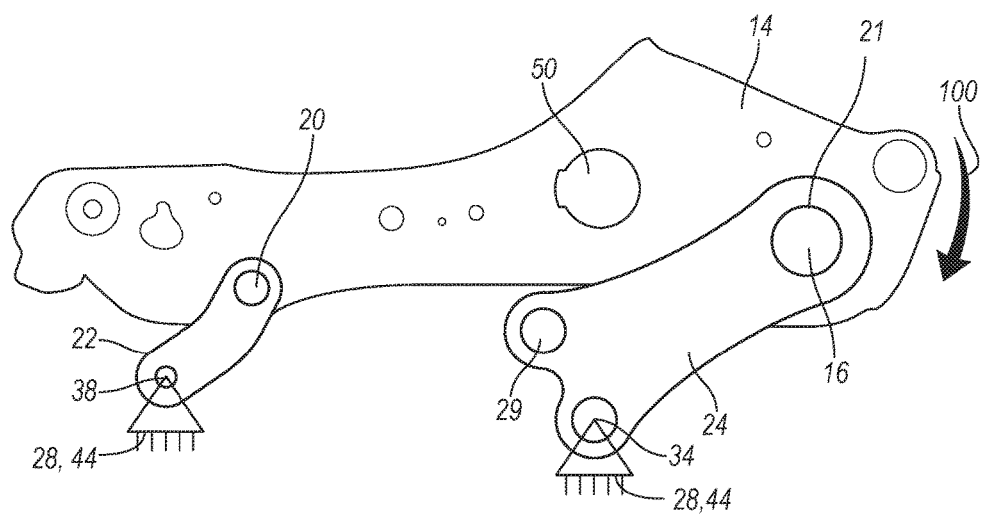
FIG. 3 is a schematic view of the kinematics of the seat assembly.

As shown in FIG. 3, each side member 14 is connected to a front link 22 with a connector 20 and a rear link 24 with a connector 21. The connectors 20 and 21 enable each of the front link 22 and the rear link 24 to rotate relative to the side member 14. The front link 22 and the rear link 24 are also connected to a slide mechanism 44 by connectors 38 and 34, respectively, such that each of the front link 22 and the rear link to rotate relative to the slide mechanism 44. An identical arrangement is associated with a rail 30. The slide mechanisms 44 slide fore and aft (that is, forward and backward along their respective rails 28 and 30. Accordingly, this configuration provides two way movement to the seat assembly 10. The seat assembly 10 further includes a front tube 20 and a rear tube 16 that connects the side members 14 together so that the two side members 14 move together.

As further illustrated in FIG. 3, the slide mechanism 44, and hence their respective rail 28, the front link 22, the side member 14, and the rear link 24 form a four-bar linkage. A similar linkage is formed by the components associated with the rail 30. The seat assembly 10 may include an electrical or mechanical height adjuster mechanism 26 that is configured to raise and lower the side members 14 and consequently the seat 12. More specifically, the height adjuster mechanism 26 is connected at one end to the front link 22 and at the other end to the rear link 24. Therefore, as the height adjuster mechanism expands, the side members 14 and the seat 12 are lowered as indicated by the arrow 100. And as the height adjuster 26 contracts, the side members 14 and the seat 12 are raised in the opposite direction of the arrow 100. Hence, the height adjuster mechanism 26 provide the seat assembly 10 four way movement, that is, up and down movement, as well as, backward and forward movement described previously.

Figure 2:
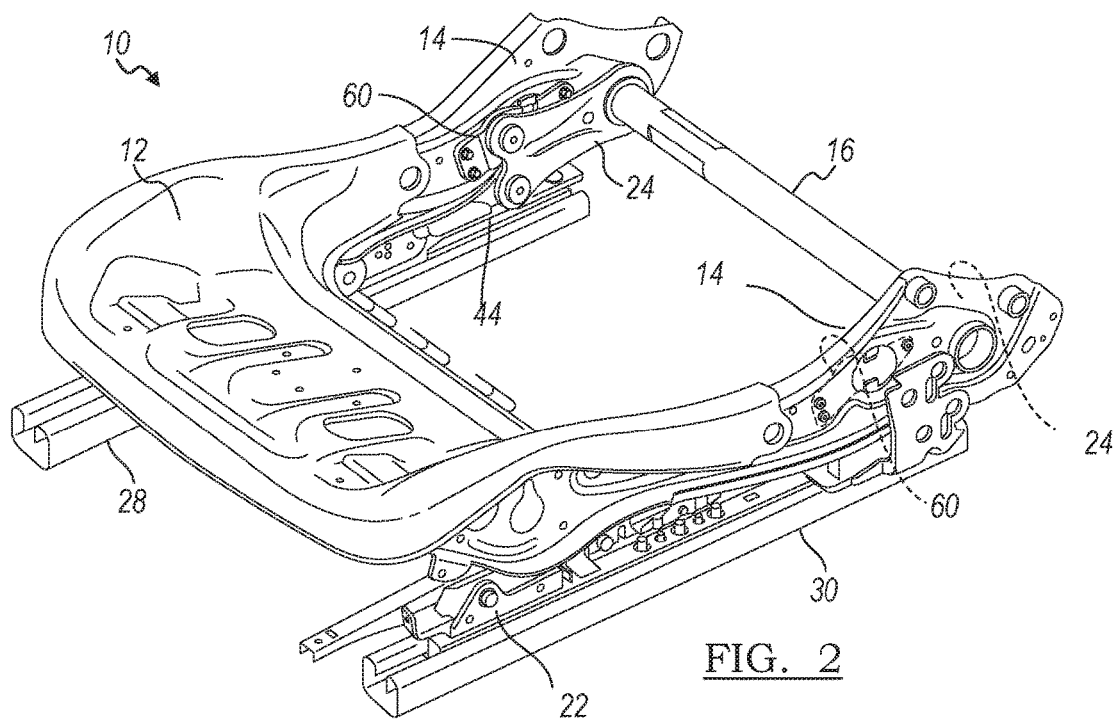
FIG. 2 is a perspective view of the seat assembly with a transformation bracket in accordance with the principles of the present disclosure.

Referring now to FIG. 2, a transformation bracket 60 attached to one or both side members 14 converts the seat assembly 10 from four way movement to two way movement in accordance with the principles of the present disclosure. In such a configuration, the inclusion of the height adjuster mechanism may be optional.

Utilization of the transformation bracket 60 prevents rotational movement of each of the front link 22 and the rear link 24 relative to the side members 14 as well as the slide mechanisms 44. Hence, the side members 14 are prevented from moving in the direction of the arrow 100 or in the opposite direction of the arrow 100. Therefore, with the use of the transformation bracket 60, the seat 12 is able to translate backward and forward along the rails 28 and 30 but are not able to move up and down relative to the rails 28 and 30. Hence, the seat assembly 10 is restricted to two way movement.

Figure 4:
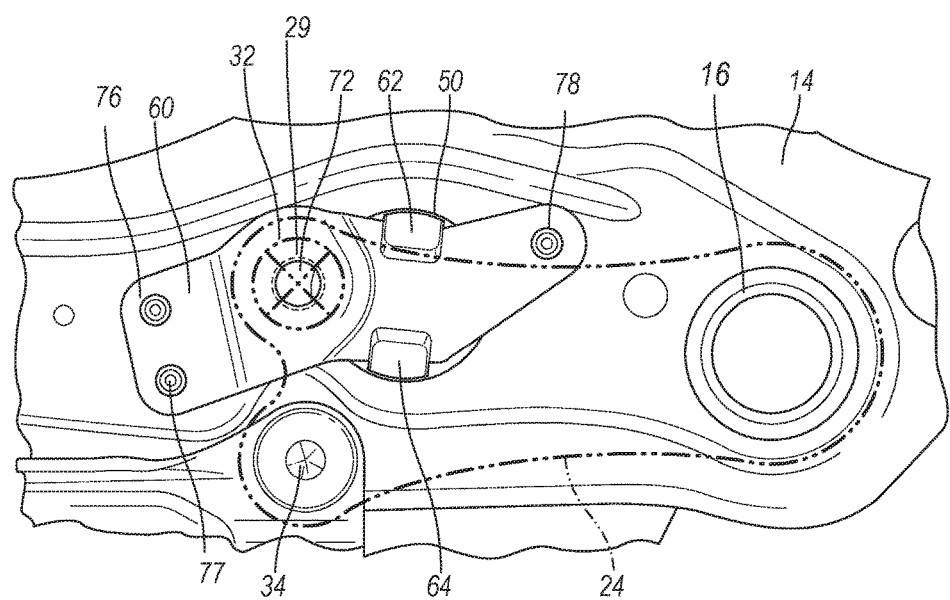
FIG. 4 is a side view of the transformation bracket of the seat assembly shown in FIG. 2.
Figure 5:
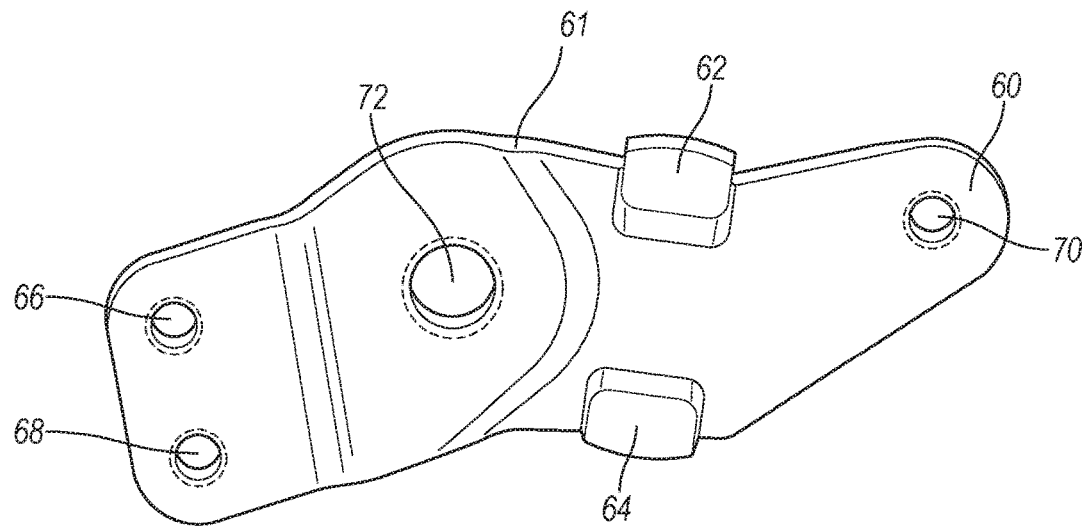
FIG. 5 is an isolated view of the transformation bracket.
Figure 6:
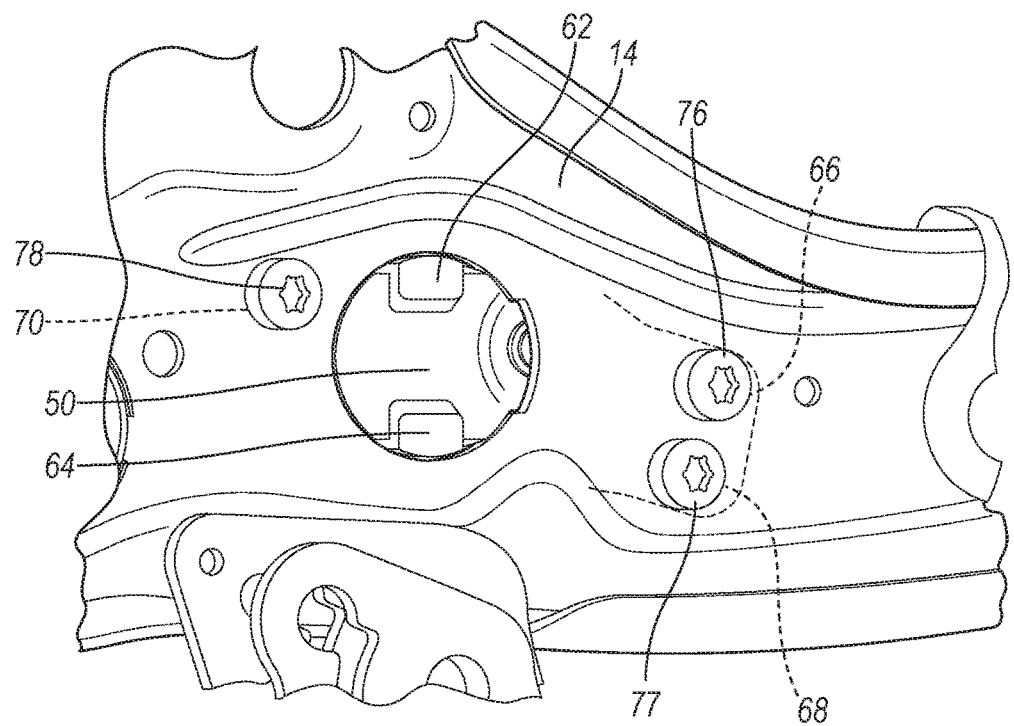
FIG. 6 is a view of a side member of the seat assembly shown in FIG. 2 engaged with the transformation bracket.

Referring further to FIGS. 4, 5 and 6, the transformation bracket 60 includes a main portion 61 with a set of holes 66, 68 and 70. A set of bolts 76, 77 and 78 attaches and secures the transformation bracket 60 to the side member 14. The seat assembly 10 may include a single transformation bracket 60 in some configurations, while in other configurations, each side member 14 has a transformation bracket 60.

The transformation bracket also includes one or more raised portions or tabs 62, 64 that engage with an opening 50 in the side member 14 to position the transformation bracket relative to the side member 14. A bolt 32 is threaded through an opening 29 of the rear link 24 and an opening 72 of the transformation bracket 60 to prevent movement of the rear link 24, as well as the rear tube 16, relative to the transformation bracket 60 and, hence, to the side member 14.

A seat assembly of the present disclosure offers several advantages. In particular, a single assembly design can be developed for both two way and four way movement. Hence, cost reductions can be achieved by developing a single assembly rather than an assembly for four way movement and a separate assembly for two way movement.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat assembly for a motor vehicle comprising:
    a side member;
    a front link;
    a rear link;
    a rail together with the first side member, the front link and the rear link forming a four-bar linkage with four way movement; and
    a transformation bracket that is attached to the first side member and connected to the rear link to convert the seat assembly with four way movement to two way movement, the transformation bracket having two raised portions that engage with an opening in the side member to prevent relative motion between the rear link and the side member.

2. The seat assembly of claim 1 further comprising a second side member spaced apart and substantially parallel to the first side member.

3. The seat assembly of claim 2 further comprising a front tube and a rear tube spaced apart from the front tube, the first side member and the second side member being connect by the front tube and the rear tube.

4. The seat assembly of claim 2 further comprising a second transformation bracket that is attached to the second side member and connected to a second rear link to convert the seat assembly with four way movement to two way movement.

5. The seat assembly of claim 1 wherein the transformation bracket is attached to the side member with a plurality of bolts.

6. The seat assembly of claim 5 wherein the plurality of bolts is three bolts.

7. The seat assembly of claim 1 wherein the transformation bracket is connected to the rear link with a bolt.

8. The seat assembly of claim 1 wherein two of the four way movement are vertical movements with respect to the rail and the other two movements are translational movements along the rail.

9. The seat assembly of claim 1 wherein the two way movement are translational movements along the rail.

10. A transformation bracket for a motor vehicle seat assembly, the transformation bracket comprising:
a main body portion attached to a side member of the seat assembly; and
two raised portions that engage with an opening of a side member of the seat assembly, the main body portion being connected to a rear link of the seat assembly, the engagement of the two raised portions with the opening of the side member preventing relative motion between the rear link and the side member.

11. The transformation bracket of claim 10 wherein the transformation bracket is attached to the side member with a plurality of bolts.

12. The transformation bracket of claim 11 wherein the plurality of bolts is three bolts.

13. The transformation bracket of claim 10 wherein the transformation bracket is connected to the rear link with a bolt.

14. The transformation bracket of claim 10 wherein two of the four way movement are vertical movements with respect to the rail and the other two movements are translational movements along the rail.

15. The transformation bracket of claim 10 wherein the two way movement are translational movements along the rail.

16. A seat assembly for a motor vehicle comprising:
a first side member and a second side member spaced apart from and substantially parallel to the first side member;
a first front link and a second front link;
a first rear link and a second rear link;
a first rail and a second rail spaced apart from and substantially parallel to the first rail, the first rail together with the first side member, the first front link and the first rear link and the second rail together with the second side member, the second front link and the second rear link forming a four-bar linkage with four way movement;
a first transformation bracket that is attached to the first side member and connected to the first rear link; and
a second transformation bracket that is attached to the second side member and connected to the second rear link, the first and second transformation brackets preventing relative movement between the side members and the respective rear links to convert the seat assembly with four way movement to two way movement,
wherein each of the first and second transformation brackets has two raised portions that engage with the first side member and the second side member, respectively, to prevent relative motion between the first rear link and the first side member and between the second rear link and the second side member.

* * * * *